United States Patent [19]

Dautriche

[11] Patent Number: 5,656,806

[45] Date of Patent: Aug. 12, 1997

[54] CIRCUIT TO ELIMINATE THE DARK CURRENT OF A PHOTODETECTOR

[75] Inventor: Pierre Dautriche, Claix, France

[73] Assignee: Thomson-CSF Semiconducteurs Specifiques, Paris, France

[21] Appl. No.: 500,323

[22] Filed: Jul. 10, 1995

[30] Foreign Application Priority Data

Jul. 12, 1994 [FR] France ................ 94 08632

[51] Int. Cl.$^6$ ............................... H01J 40/14
[52] U.S. Cl. ................ 250/214 R; 250/214 C; 348/243; 327/514
[58] Field of Search ............... 250/208.1, 208.2, 250/214 R, 214 A, 214 LA, 214 LS, 214 L, 214 C; 348/243, 241, 308; 327/514, 515

[56] References Cited

U.S. PATENT DOCUMENTS

| | | |
|---|---|---|
| 4,839,735 | 6/1989 | Kyomasu et al. |
| 4,857,725 | 8/1989 | Goodnough et al. ............ 327/514 |
| 4,945,418 | 7/1990 | Muton . |
| 5,057,682 | 10/1991 | Michon et al. ............ 250/214 C |
| 5,343,034 | 8/1994 | Sato ............ 327/514 |

FOREIGN PATENT DOCUMENTS 0 361 000   4/1990   European Pat. Off. .

Primary Examiner—Edward P. Westin
Assistant Examiner—John R. Lee
Attorney, Agent, or Firm—Oblon, Spivak, McClelland, Maier & Neustadt, P.C.

[57] ABSTRACT

Disclosed is a photodetector comprising at least one photosensitive diode and at least one read circuit enabling the charges generated by photoelectric effect in said diode to be converted into a voltage information element sampled by a switch, wherein said photosensitive diode has a first terminal connected to the gate and to the drain of a first transistor and a second terminal connected to the source of said first transistor and to the ground of said photodetector, wherein a second transistor with dimensions proportional to those of said first transistor is mounted as a current mirror with respect to said first transistor and wherein an integration capacitor is connected to the drain of said second transistor so as to collect said voltage information element at its terminals.

16 Claims, 2 Drawing Sheets

CIRCUIT TO ELIMINATE THE DARK CURRENT OF A PHOTODETECTOR

BACKGROUND OF THE INVENTION

1. Field of the Invention

The present invention relates to a photodetector and more particularly to a photodiode current reading circuit that enables the dark current of the photodetector to be eliminated to the utmost possible extent.

Photodetectors such as those used for example in visible or infrared imaging are formed by two main elements: a photosensitive element and a multiplexer. The photosensitive element is formed by photodiodes that are arranged in linear arrays or matrices and enable the generation of charges by photoelectrical effect. The multiplexer converts and transmits the charges thus generated by producing a useful electrical signal.

2. Description of the Prior Art

According to the prior art, each photodiode is reverse-biased at a relatively high voltage. It follows therefrom that the reverse current that flows through the diode when there is no radiation, commonly called a dark current, is itself also relatively high. When there is a low-amplitude radiation, the detected signal then contains a high noise level. This is of course a drawback.

Another drawback lies in the fact that the different photodiodes forming the array or the matrix are not perfectly identical.

It follows therefrom that their dark currents have different values. It is then necessary to perform an operation to calibrate the detector so as to take account of this variation. This calibration is a painstaking operation.

The invention does not have these drawbacks.

An object of the present invention is a photodetector comprising means enabling the elimination of the dark current and hence of the detection noise associated with this dark current.

According to the invention, instead of supplying the photodiode with a negative bias voltage, a non-linear load acting as a voltage limiter is connected to the terminals of the photodiode. This non-linear load tends to keep the bias of the diode close to zero volts. A current mirror type of copying circuit is used to copy the current in the non-linear load and the current thus copied is measured. The photodiode is not supplied by a voltage source as in the prior art. The bias voltage that is set up at its terminals is due solely to the photoelectrical energy generated by the photodiode.

Through this assembly, the dark current is low, for the photodiode remains always biased at a very low voltage for which the dark current is minimal. This current remains low both at the start of an illumination measurement stage and at the end of this stage. In the prior art, the initial bias of the photodiode would prompt a high dark current and, furthermore, the value of the dark current would vary between the start of the measuring phase and the end of the measuring phase. The variation would then be a function of the illumination. The average dark current during the measurement was all the greater as the measured illumination was low. This was particularly harmful. These drawbacks have been eliminated by the invention.

SUMMARY OF THE INVENTION

According to the invention therefore, there is proposed a photodetector comprising at least one photosensitive diode and a circuit for reading the current generated by the photodiode, wherein the reading circuit comprises:

a non-linear load acting as a voltage limiter connected to the terminals of the photodiode to keep the voltage at the terminals of the photodiode in the vicinity of zero volts, the diode and the load being not supplied by an energy source, a means to copy the current in the load, and a circuit to read the current copied.

Preferably, the non-linear load is a field-effect transistor whose gate is connected to the drain and to a terminal of the photodiode (anode if the transistor is an N channel transistor and cathode if it is a P channel transistor), and whose source is connected to the other terminal.

The copying circuit is then simply formed by another transistor, of the same type with dimensions equal or proportional to those of the first transistor, the gate and source of this other transistor being connected respectively to the gate and to the source of the first transistor.

The circuit for measuring the copied current may then comprise simply an integration capacitor supplied by the copying circuit, and a switch activated periodically to discharge the capacitor before each new reading operation.

The invention is useful essentially for arrays or matrices of several photodiodes, a respective reading circuit being associated with each photodiode. It can be applied especially to infrared detectors.

BRIEF DESCRIPTION OF THE DRAWINGS

Other features and advantages of the invention shall appear from the description of a preferred embodiment made with reference to the appended figures, of which.

In all the figures, the same references are used to designate the same elements.

MORE DETAILED DESCRIPTION

Figure 1:
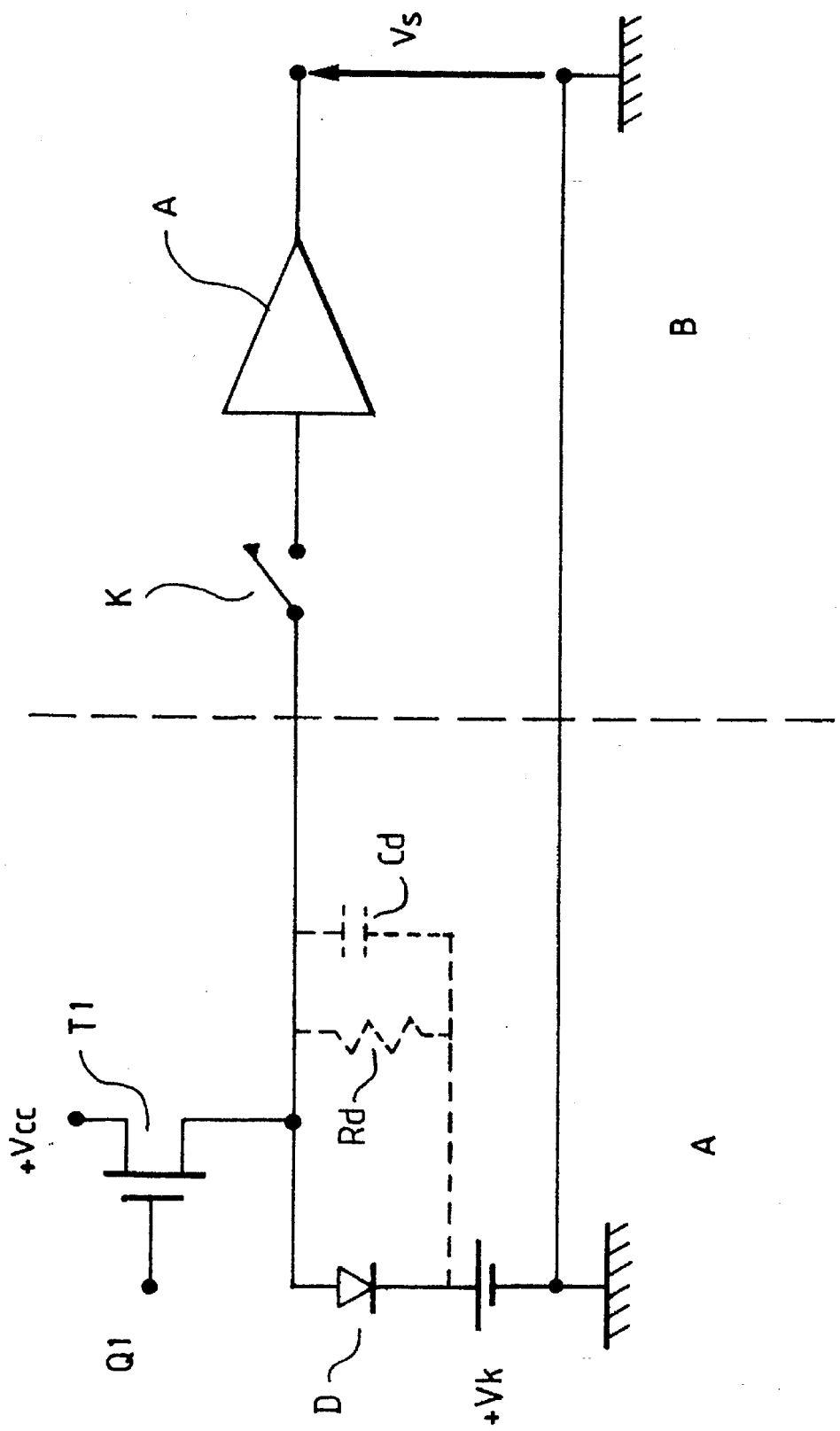
FIG. 1 is an electrical diagram showing the principle of a prior art detector circuit.

FIG. 1 is an electrical diagram showing the principle of a prior art detector circuit.

This circuit has only one photodiode D. As mentioned here above, the detectors take the form of arrays or matrices. They therefore have several photodiodes. It is for reasons of simplicity of depiction that the circuit has only one photodiode.

FIG. 1 is divided into two zones. In a first zone A, there are the elements located in the photosensitive part of the detector. A photodiode D, for which the elements of the equivalent diagram Rd and Cd are shown in dashes, has its anode connected to a positive bias voltage +Vcc by means of a transistor T1 controlled by the signal Q1 and its cathode connected to a positive voltage +Vk greater than Vcc.

A second zone B has the elements of the electrical circuit located in the multiplexer, these elements enabling the retrieval of information at the terminals of the photodiode. These elements are formed by a switch K and an amplifier A. The switch K connects the anode of the photodiode to the input of the amplifier A. The output voltage Vs of the detector is taken between the output of the amplifier A and the ground of the circuit.

As is known to those skilled in the art, the positive voltage +Vcc is applied to the anode of the photodiode D under the effect of the control signal Q1. The capacitor Cd of the photodiode is then charged by the application to its terminals of the reverse voltage Vinv=Vk–Vcc. Since the switch K is open, the capacitor Cd is then discharged. The operating point of the photodiode is modified during this discharging. It describes the current/voltage characteristic of the diode. The current that flows through the current is a reverse current formed by the dark current. In the event that the diode is illuminated, it is a photocurrent. When the switch K is closed, the sampled voltage is amplified by the amplifier A.

As mentioned here above, this gives rise to many drawbacks. In particular, the III/V type photodiodes such as GaInAs type photodiodes have high dark currents when they are reverse-biased. The modifications of their bias point are then great and, by virtue of this very fact, lead to a major variation in the dark currents. More particularly, in the case of GaInAs type detectors where positive charges are read, the photodiode D is greatly shifted. This shift then gives rise to a high dark voltage limiting the low-level resolution of the detector.

Furthermore, the sampling noise due to the switch-over of the voltage +Vcc applied at regular intervals to the capacitor Cd is relatively high. The level N of this noise is expressed approximately by the formula: N=400√Cl. Since the capacitor Cd has a value of capacitance in the range of 0.5 pF, the noise level N may be assessed at 280 electrons.

Figure 2:
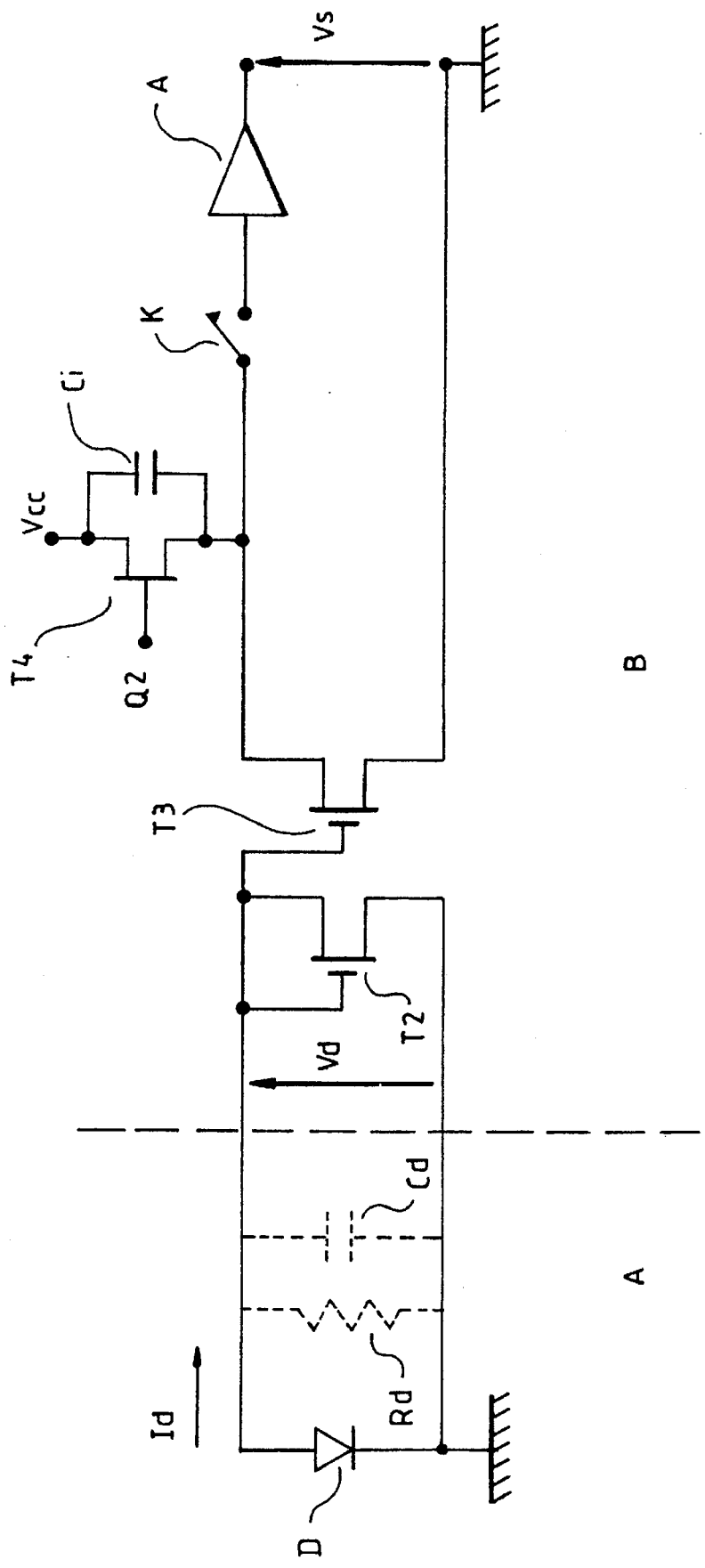
FIG. 2 is an electrical diagram showing the principle of a detector circuit according to the invention.

FIG. 2 is an electrical diagram showing the principle of a detector circuit according to the invention.

For the same reasons as those given here above, the circuit shown in FIG. 2 has only one diode D although the invention relates to detectors having several photodiodes arranged in the form of arrays or matrices.

As in the case of FIG. 1, FIG. 2 is divided into two zones A and B. A first zone A has the photodiode D for which elements of the equivalent diagram Rd and Cd are shown in dashes. A second zone B has the elements of the electrical circuit enabling the retrieval of the information at the terminals of the photodiodes. The elements of the zone B are formed by three transistors T2, T3, T4, an integration circuit Ci, a switch K and an amplifier A.

The MOS transistor T1, for example an NMOS type transistor, is parallel-connected with the diode D.

The transistor T2 has its drain and gate connected to each other and to the anode of the photodiode D, and its source connected both to the cathode of the photodiode and to the ground of the circuit. The transistor T3 has its gate connected to the gate of the transistor T2 and its drain connected firstly to a voltage +Vcc, for example equal to +5 V, by means of a transistor T4 and, secondly, to one of the terminals of a switch K whose other terminal is connected to the input of an amplifier A. The source of the transistor T3 for its part is connected to the ground of the circuit. The integration capacitor Ci is parallel-connected with the transistor T4.

Just as in the prior art, the output voltage of the detector is taken between the output of the amplifier A and the ground of the circuit.

According to the invention, no reverse voltage is applied to the photodiode D which is therefore carried to the potential zero by its resistance Rd. One advantage of the invention therefore is the elimination of the dark current which, according to the prior art, goes through the diode owing to the reverse bias that is applied to it. When the photodiode is illuminated, a photocurrent flows in the circuit formed by the photodiode D and the transistor T2. The photodiode then works like a current generator delivering current to the load formed by the transistor T2.

The transistor T2 is chosen with a relatively high threshold voltage, for example a voltage of about 0.7 volts, so as to work in the characteristic zone known to those skilled in the art as the low reversal zone. The current Id flowing through the transistor is then related to the voltage Vd which is at its terminals by the relationship:

$$Id = Is \exp \frac{qVd}{kT}$$

with:

Is=saturation current of the transistor
q=charge of the electron
k=Boltzmann constant
T=absolute temperature of the transistor.

The voltage Vd applied to the gate of the transistor T2 is then given as a function of the photocurrent Id by the relationship:

$$Vd = \frac{kT}{q} \log \frac{Id}{Is}$$

One advantage of the invention is that the voltage Vd is made to vary logarithmically as a function of the photocurrent Id, thus enabling the variations of the voltage Vd to be limited as a function of the current Id.

The saturation current Is is proportional to the ratio of the gate width to the gate length of the transistor. The geometry of the transistor T2 is then chosen so that the voltage Vd gets stabilized at a given value, equal for example to 0.1 volts.

As has been mentioned here above, the gates of the transistors T2 and T3 are connected to each other.

The voltage Vd present at the terminals of the diode D is therefore applied to the gate of the transistor T3. This transistor has dimensions proportional to those of the transistor T2. The factor of proportionality k is a positive number that is lower than or greater than or equal to 1. The transistor T3 therefore forms a current mirror of the transistor T2. It follows therefrom that the current I that flows through the transistor T3 has an intensity equal to kId. One advantage of the invention therefore is to make it possible to provide a current gain if I should be greater than 1 or again a current attenuation if k should be smaller than 1.

The switch K being open, the current Id that flows through the transistor T3 then charges the integration capacitor Ci which has previously been discharged by short-circuiting under the effect of the control signal Q2 applied to the gate of the transistor T4. When the switch K is closed, the voltage detected is amplified by the amplifier A.

One advantage of the invention is that it eliminates the dark current and therefore the detection noise associated with this dark current. Another advantage of the invention is that it reduces the noise due to the switch-over of the voltage applied to the integration capacitor. As recalled here above, the level N of this noise is expressed by the formula:

$$N = 400 \sqrt{Ci}$$

According to the invention, the value of the capacitor Ci may be chosen, for example, to be about 0.05 pF. Advantageously, the switch-over noise level is then reduced to about 100 electrons.

According to the exemplary embodiment chosen, the transistors T2 and T3 are NMOS type transistors and the photodiode D has its cathode connected to the ground of the device and its anode connected to the gate and to the drain of the transistor T2.

The invention relates however to other embodiments where the transistors T2 and T3 are PMOS type transistors and where the photodiode D has its anode connected to the ground of the device and its cathode connected to the gate and to the drain of the transistor T2.

The present invention can be applied to any type of defector and, more particularly, to infrared detectors whose photosensitive element is formed by photodiodes arranged in matrix form coupled to the electrical detection circuits contained in the multiplexer by indium beads.

As an example of an embodiment implementing the present invention, we may cite an array of infrared photodetectors based on a ternary GaInAs material connected to the input stage described here above, which is itself connected to a CCD register given the task of transferring the charges read by the detector to the information processing circuit.

What is claimed is:

1. A photodetector comprising at least one photosensitive diode and at least one read circuit enabling the charges generated by photoelectric effect in said diode to be converted into a voltage information element sampled by a switch, wherein said photosensitive diode has a first terminal connected to the gate and to the drain of a first transistor and a second terminal connected to the source of said first transistor and to the ground of said photodetector, wherein a second transistor with dimensions proportional to those of said first transistor is mounted as a current mirror with respect to said first transistor and wherein an integration capacitor is connected to the drain of said second transistor so as to collect said voltage information element at its terminals.

2. A photodetector according to claim 1, wherein said first transistor is chosen so as to work in the zone of the so-called low reversal characteristic.

3. A photodetector according to claim 2, wherein a transistor is parallel-connected with said integration capacitor so as to discharge it prior to the charging due to the current that flows through said transistor.

4. A photodetector according to any of the claims 1 to 3, wherein said first and second terminals are respectively the anode and the cathode of the photodiode and wherein said first and second transistors are N type MOS transistors.

5. A photodetector according to any of the claims 1 to 3, wherein said first and second terminals are respectively the cathode and the anode of the photodiode and wherein said first and second transistors are P type MOS transistors.

6. A photodetector according to claim 1, wherein the photodiodes are arranged in the form of arrays.

7. A photodetector according to claim 1, wherein the photodiodes are arranged in the form of matrices.

8. A multiplexer enabling the charges generated by a photosensitive element constituted by at least one photodiode to be converted into a voltage information element sampled by a switch, wherein it has a first transistor whose gate and drain are connected to each other and to a first terminal of said photodiode and whose source is connected to the ground of the multiplexer and to a second terminal of said photodiode, a second transistor with dimensions proportional to those of said first transistor and constituting a current mirror with respect to said first transistor and an integration capacitor connected to the drain of said second transistor and enabling said voltage information element to be collected at its terminals.

9. A multiplexer according to claim 8, wherein said first transistor is chosen so as to work in the zone of the so-called low reversal characteristic.

10. A multiplexer according to claim 9, wherein a transistor is parallel-connected with said integration capacitor so as to discharge it prior to the charging due to the current that flows through said second transistor.

11. A photodetector according to any of the claims 8 to 10, wherein said first and second terminals are respectively the anode and the cathode of the photodiode and wherein said first and second transistors are N type MOS transistors.

12. A photodetector according to any of the claims 8 to 10, wherein said first and second terminals are respectively the cathode and the anode of the photodiode and wherein said first and second transistors are P type MOS transistors.

13. A photodetector comprising at least one photosensitive diode and a circuit for reading the current generated by the photodiode, wherein the reading circuit comprises:

a non-linear load acting as a voltage limiter connected to the terminals of the photodiode to keep the voltage at the terminals of the photodiode in the vicinity of zero volts, the diode and the load being not supplied by a voltage source, a means to copy the current in the load, and a circuit to read the current copied.

14. A photodetector according to claim 13, wherein the non-linear load is a field-effect transistor whose gate is connected to the drain and to a terminal of the photodiode and whose source is connected to the other terminal.

15. A photodetector according to claim 14, wherein the copying circuit is formed by another transistor, of the same type with dimensions equal or proportional to those of the first transistor, the gate and source of this other transistor being connected respectively to the gate and to the source of the first transistor.

16. A photodetector according to one of the claims 13 to 15, wherein the circuit for measuring the copied current may then comprise simply an integration capacitor supplied by the copying circuit, and a switch activated periodically to discharge the capacitor before each new reading operation.

\* \* \* \* \*